Figure 1:
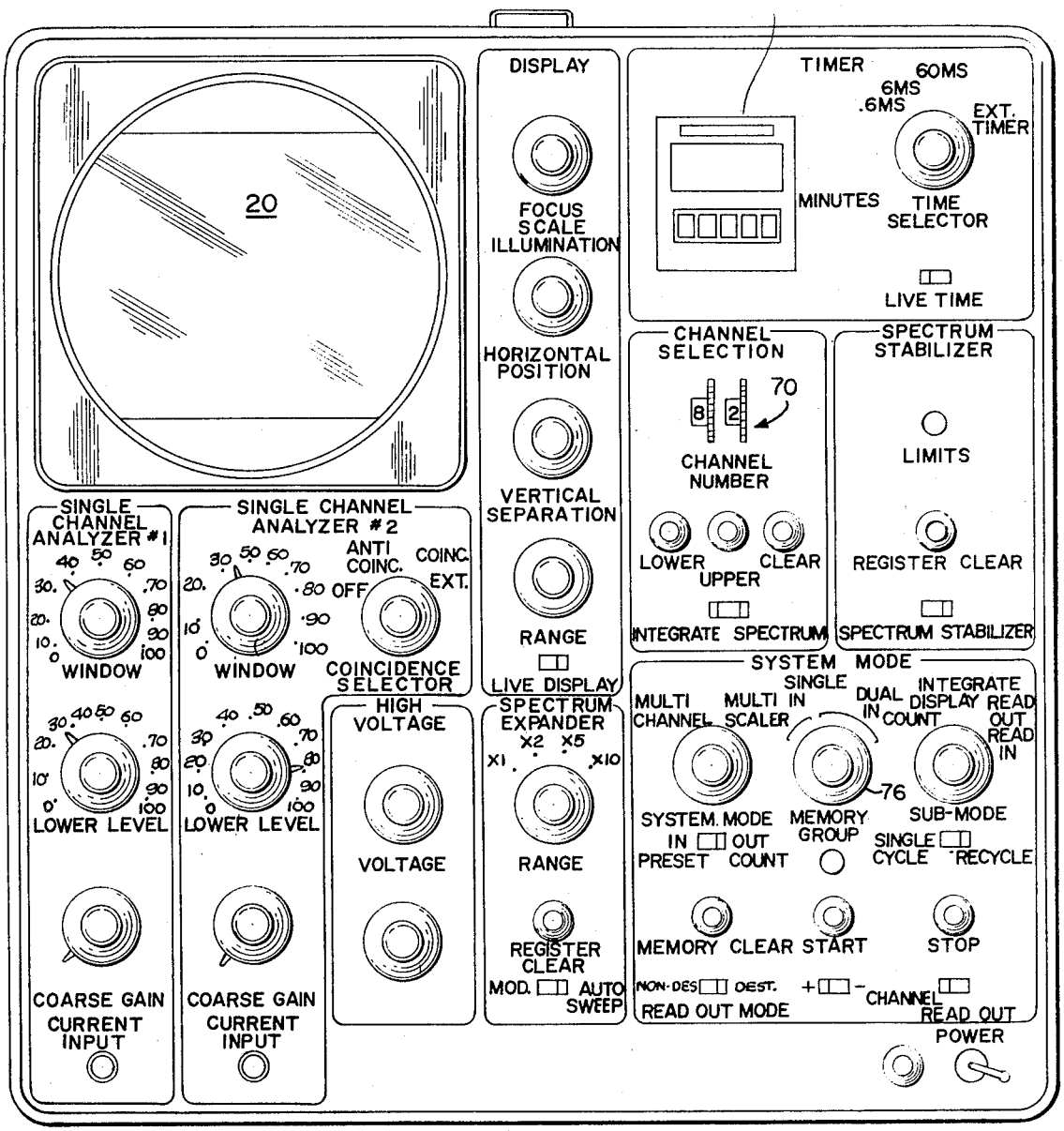

[11] 3,634,688

| | | | |
|---|---|---|---|
| [72] | Inventor | James V. Di Rocco Winchester, Mass. | |
| [21] | Appl. No. | 4,452 | |
| [22] | Filed | Jan. 19, 1970 | |
| [45] | Patented | Jan. 11, 1972 | |
| [73] | Assignee | Baird-Atomic, Inc. Cambridge, Mass. Continuation of application Ser. No. 648,495, June 23, 1967, now abandoned. This application Jan. 19, 1970, Ser. No. 4,452 | |

[54] MULTIMODE SPECTRAL ANALYZER
9 Claims, 8 Drawing Figs.

[52] U.S. Cl. .................................................. 250/71.5 R, 250/83.1, 250/83.3 R, 307/235, 324/77 A, 328/116, 340/347
[51] Int. Cl. ................................................ G01t 1/20
[50] Field of Search........................................ 250/71.5, 83.3, 83.6 W, 83.1; 324/77 A, 99 D; 340/347; 328/116, 117; 307/235

[56] References Cited
UNITED STATES PATENTS
| | | | |
|---|---|---|---|
| 2,820,896 | 1/1958 | Russell et al................. | 324/77 A |
| 3,125,721 | 3/1964 | Schulmann.................. | 324/77 A |
| 3,233,103 | 2/1966 | Aoki............................ | 250/83.1 |
| 3,376,420 | 4/1968 | Frank.......................... | 250/83.1 |
| 3,200,251 | 8/1965 | Youmans ..................... | 250/83.6 W |
| 3,309,521 | 3/1967 | Bargainer, Jr. .............. | 252/83.6 W |
| 3,270,205 | 8/1966 | Ladd et al.................... | 250/71.5 |

OTHER REFERENCES
Farley; F. J. Progress in Nuclear Techniques & Inst.; Vol. I, 1965, pp. 239-246

*Primary Examiner*—James W. Lawrence
*Assistant Examiner*—Morton J. Frome
*Attorney*—Morse, Altman & Oates

ABSTRACT: A multimode spectral analyzer which is capable of operating selectively as a multichannel pulse height analyzer, a multiscaler, a Mossbauer analyzer, or as a signal enchancer is provided for processing the output of radiation detectors. The multimode spectral analyzer includes a multichannel analyzer for determining the pulse amplitude range to be analyzed, an analog to digital converter for providing a series of pulses proportional to the pulse heights from the multichannel analyzer, a memory for storing the series of pulses from the analog to digital converter, and a display for presenting the information stored in the memory.

MULTIMODE SPECTRAL ANALYZER

This is a continuation of application Ser. No. 648,495, filed June 23, 1967, now abandoned.

This invention relates generally to spectral analyzers of the sort adapted to process the output of radiation detectors. More particularly this invention is directed towards a multipurpose spectral analyzer adapted to function in a number of different operating modes.

In general, a spectral analyzer is an instrument used in the study of radioactive material and is capable of classifying pulse heights from radiation detectors into a number of levels and indicating the number of pulses of a given magnitude. In this fashion, the energy spectrum of a radioactive sample may be measured by a detector, the output of which is proportional to the energy of the isotope in the sample. Information obtained from radiation detectors, such as scintillators, is dependent primarily upon the analyzer associated with it. Initially, spectral analyzers were capable of recording gross counts only. Subsequently lower level discriminating systems were included in order to provide capability for discriminating amongst the various energies of isotopes and also to eliminate background noise. Subsequent refinements such as the variable window, a scanning spectrometer using a motor driven baseline control and then an electronic sweep followed by improved digital-to-analog baseline advance. However, even with an automatic baseline advance only a small percentage of the information available is utilized because a single channel spectrometer is capable of handling only the data in a given channel at any one time.

Accordingly, it is a general object of the present invention to provide improvements in spectral analyzers.

A more specific object of this invention is to provide a spectral analyzer having a wide range of capabilities.

Yet another object of this invention is to provide a spectral analyzer adapted to process information on multiple energy levels simultaneously and in a variety of different operating modes.

More particularly, this invention features a spectral analyzer capable of operating selectively as a multichannel pulse height analyzer, a multiscaler, a Mossbauer analyzer or as a signal enhancer.

The analyzer features the use of a magnetic memory adapted to stored digital input information for simultaneous display or later output in a variety of forms, as desired. An analog-digital converter is employed to convert the pulse heights received from the detector into a series of pulses proportional to the pulse height. These pulses are sorted in an address register and entered in the memory. This data may be visually displayed by a cathode-ray tube dynamically during the accumulation period or statically once the time or count has been reached. The memory includes subgrouping circuitry for storing data in multiple channels whereby the analyzer may obtain data simultaneously through multiple channels covering multiple specific pulse amplitudes from the detector.

This invention also features a spectrum expander circuit for expanding selected portions of the spectrum over all channels. As another feature of this invention, channels are provided for integrating the area under any or all specific portions of accumulated and displayed data. A further feature of this invention includes a multiscaler wherein each channel counts the gross count until a preset time is reached and then is sequentially stepped to the next channel until the analyzer goes through all channels. This invention also includes a coincidence and anticoincidence mode for counting with two detectors where the output to the memory is the coincidence or anticoincidence count between the two detectors.

Figure 2:
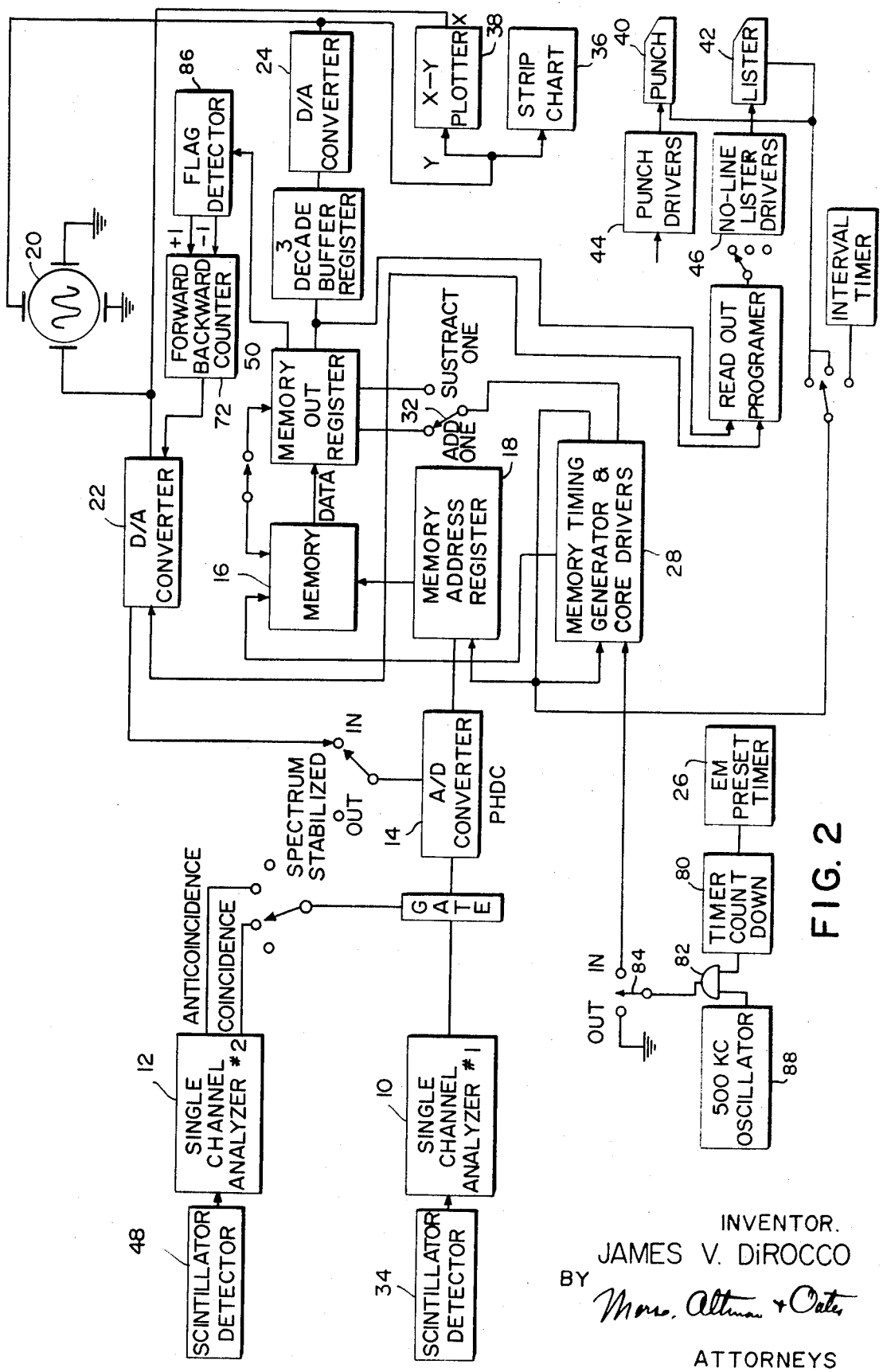
Figure 3:
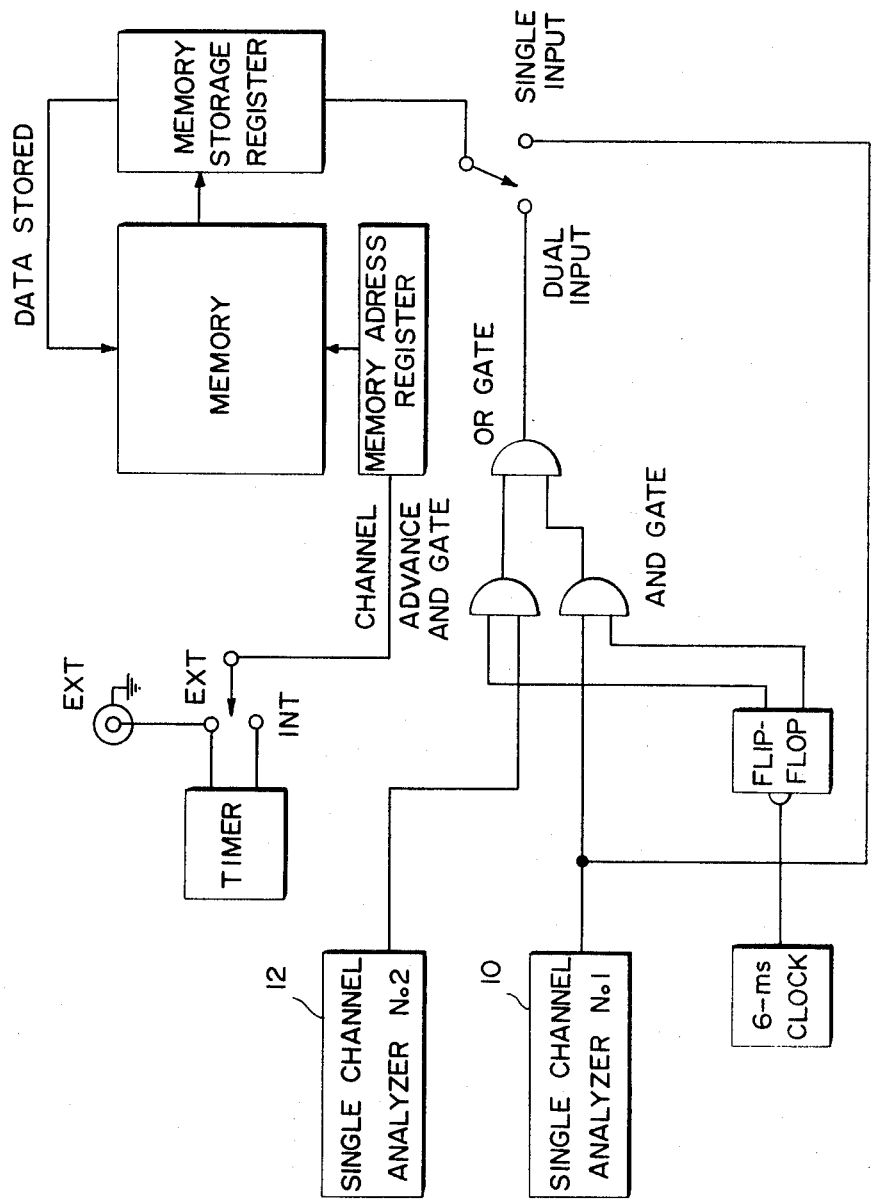
Figure 4:
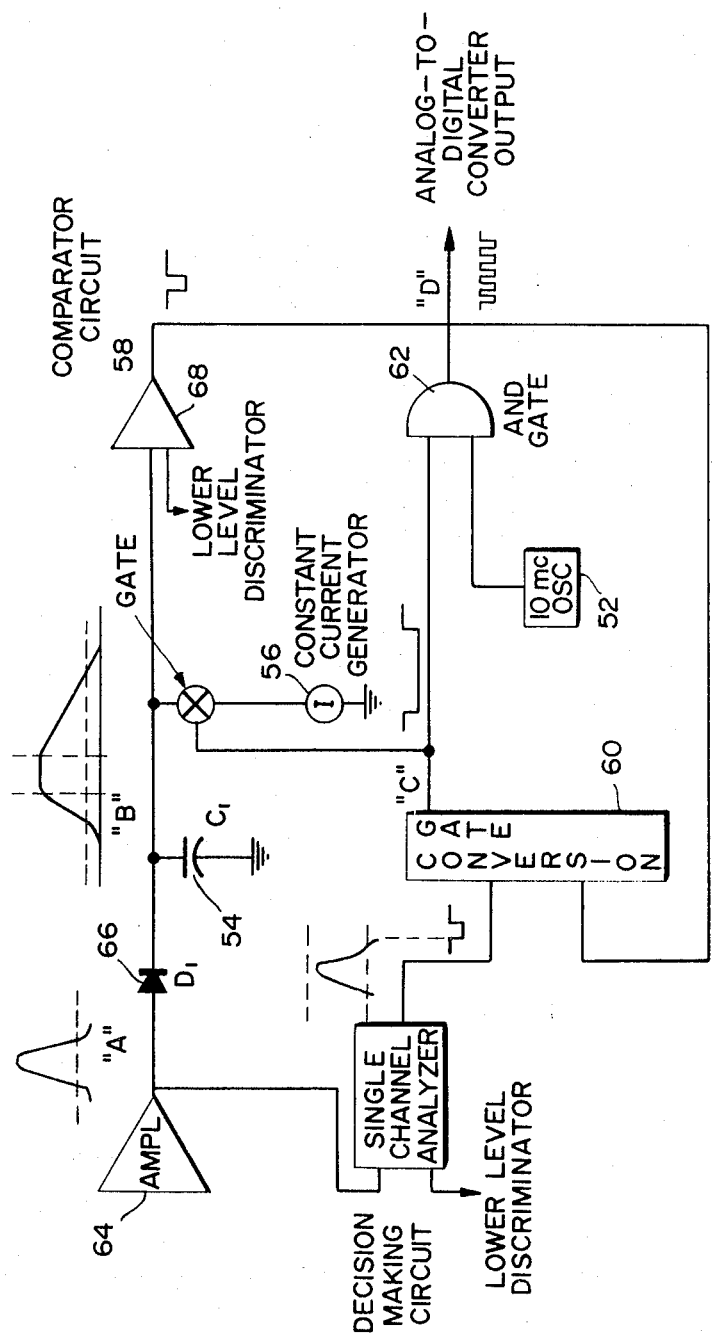
Figure 5:
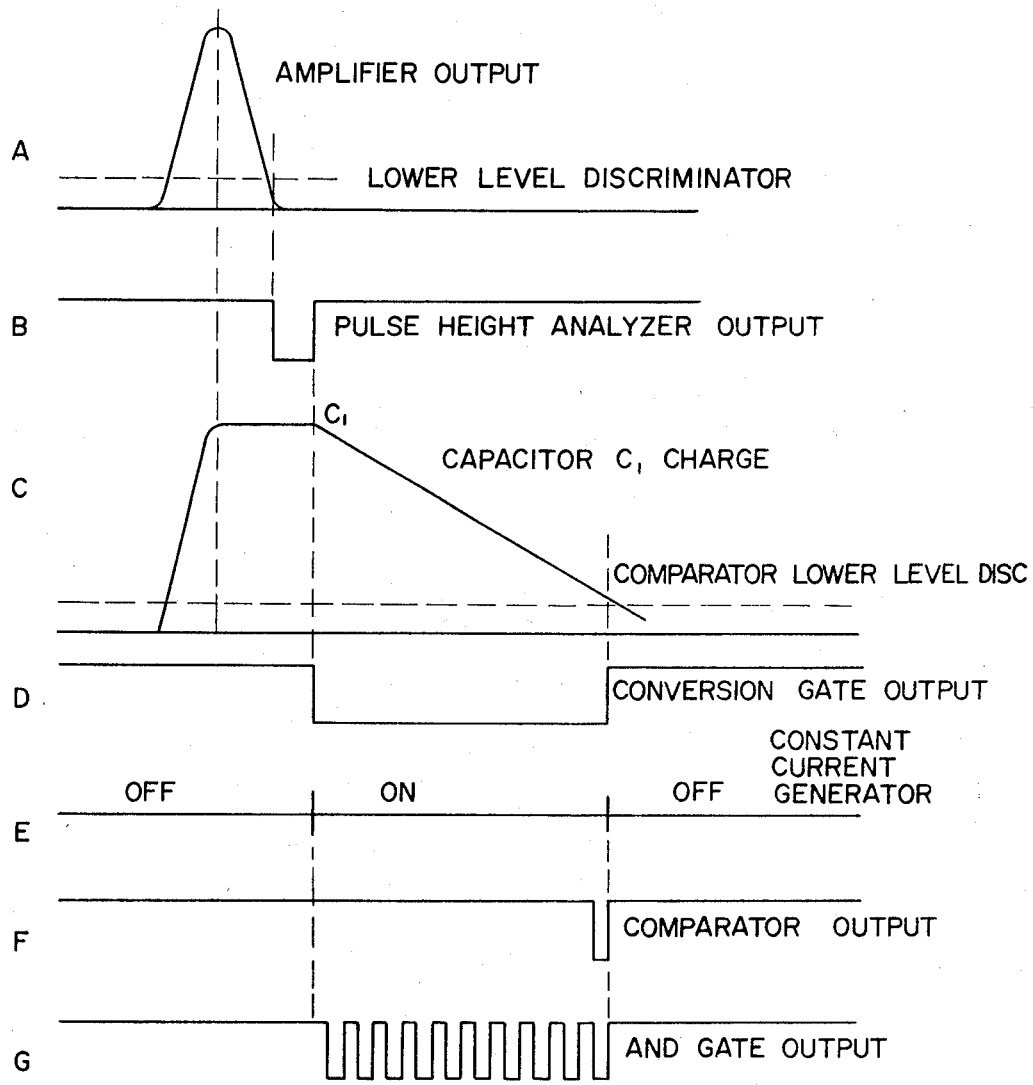
Figure 6:
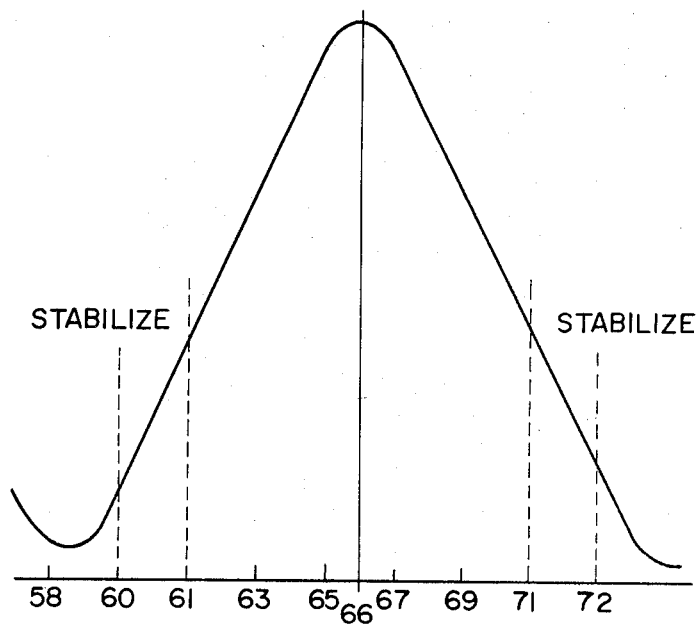
Figure 8:
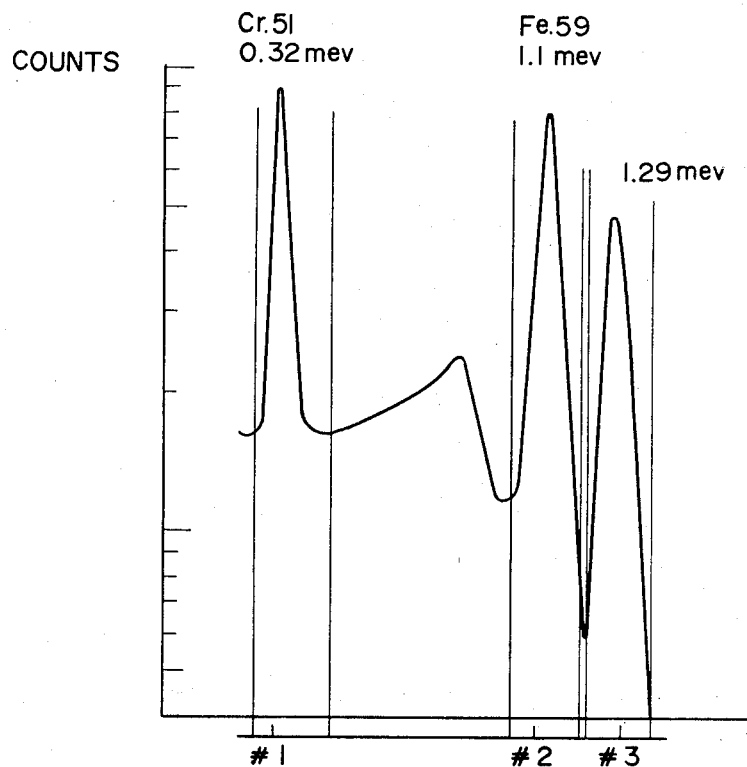
Figure 7:
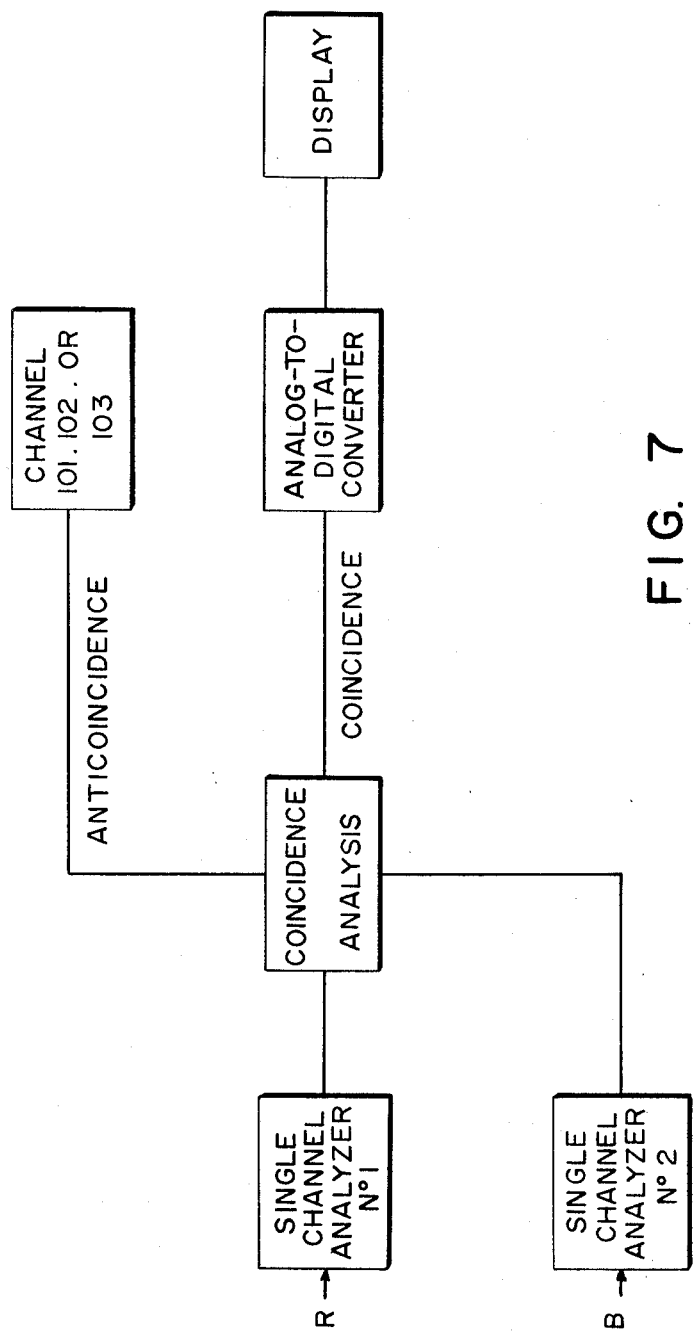

However, these and other features of the invention along with further objects and advantages thereof will become more fully apparent from the following detailed description of a preferred embodiment of the invention with reference being made to the accompanying drawings in which:

FIG. 1 is a view in front elevation of a multipurpose spectral analyzer made according to the invention, FIG. 2 is a schematic diagram of a multipurpose analyzer made according to the invention, FIG. 3 is a schematic diagram of the analyzer in a multiscaler mode, FIG. 4 is a schematic diagram of an analog-digital converter made according to the invention, FIG. 5 shows timing diagrams for the analog-digital converter of FIG. 4, FIG. 6 is a diagram of a typical spectrum stabilized channel, FIG. 7 is a block diagram of the coincidence gating arrangement employed in the invention, and, FIG. 8 is a typical spectrum showing the approximate locations of integrations and channel settings.

The spectral analyzer of this invention is a multipurpose instrument having four operating modes. The analyzer is adapted to be operated selectively as a hundred-channel pulse height analyzer, as a multiscaler, as a Mossbauer analyzer or as a signal enhancer.

Referring particularly to FIG. 2, the system will be seen to include a pair of single-channel analyzers 10 and 12, each with a variable window for determining the pulse amplitude range to be analyzed by an analog-digital converter 14. This converter is adapted to analyze the pulse heights on a time basis and by means of an oscillator converts each pulse height into a number of pulses, the number of pulses being proportional to the pulse height. The digital output of the converter 14 is delivered to a memory 16 through a memory address register 18 that sorts the pulses and determines the correct position in the memory in which they will be stored. The memory typically has 100 storage locations for input data and each location has a count capacity of $3 \times 10^5$. These 100 memory locations correspond to the 100 digitizing levels of the converter 14. The memory 16 typically is a magnetic core coincident current memory arrangement. A cathode-ray tube 20 is connected to the memory through digital-analog converters 22 and 24. The tube is adapted to visually display data from the memory, either dynamically during the accumulation period, or statically once the time or count is reached.

The instrument includes a preset timer 26 connected to a memory timing generator and core drivers 28 via a countdown timer 80, an AND-gate 82, and a preset count switch 84 for determining the length of an accumulation period. The time for a run is determined by the preset timer and can be used to count live time or elapsed time. For the live time mode, the timer is temporarily halted whenever the converter 14 is in use and cannot accept input pulses. A front panel meter 30 (FIG. 1) indicates percent lifetime. A two-position switch 32 is provided and allows the input data to be either added or subtracted from the stored data.

In the multichannel mode the output from the detector 34, for example a scintillation deflector, is fed into the analyzer 10, amplified and analyzed by the analog-digital converter 14 where it is converted to a series of digital signals corresponding to the pulse heights of the input signal. The data is then stored in digital form in the memory 16 at the location determined by the memory address register 18. Simultaneously it is displayed by the cathode-ray tube 20 and/or the information may be displayed in analog fashion by a strip chart recorder 36 or by an X-Y plotter 38. The information may also be printed out on a punch 40 or lister 42 having drivers 44 and 46 respectively connected thereto. The time to accumulate the data is dependent on the preset time or count settings, whichever comes first. The multichannel mode of the analyzer may be used to obtain energy spectra of known or unknown isotopes or for samples containing multiple tracers.

In the multichannel mode the instrument may be operated in a single cycle or in recycle operation. In the single cycle the analyzer counts and goes into display mode at the end of the accumulation period. In the recycle the analyzer goes through the count mode, then an integrate mode, and then reads out to the output printer or punch 40 or 42. At the end of the readout a new cycle starts automatically.

In the multiscaler mode of operation, (FIG. 3) the memory addresses (channels) are sequentially selected by a timer. The input pulses which are within the window of a single-channel pulse height analyzer, are counted in the memory storage register. At the end of the predetermined time increment, the count in the storage register is stored in the selected memory address after which the memory channel is indexed by one. After advancing through 100 addresses, operation stops and any data accumulated may, as in the other modes, be displayed on the cathode-ray tube and/or printed out.

The multiscaler can be operated in either single cycle or recycle mode. In the single cycle the system counts and stores pulses in a channel for a selected preset time (dwell time) after which the memory is advanced to the next channel. At the channel 99 the counting stops and the analyzer automatically switches to the display mode. In recycle the system counts for 100 channels goes into the integrate mode and then into the readout mode and repeats the cycle until the stop button is pressed. The multiscaling mode may be used for dynamic function studies such as cardiac, circulatory studies, renal clearance, etc., or for plotting decay schemes of short lived isotopes.

The use of the analyzer in the multiscaler mode with the memory grouping set for split memory readily lends itself to those applications requiring dual detectors. By way of example, detector 34 may be connected to analyzer 10 and another detector 48 may be connected to analyzer 12. Both analyzers would then be calibrated for the particular isotope being used. The time selected for accumulation will be dependent upon the application. Once the start button is pushed and the count cycle starts, the two inputs are multiplexed at a fast rate so that the information from the detector 34 is stored in channels 1 through 49 and from detector 48 in channels 50 to 99. During each accumulation each input is active 50 percent of the time.

At the end of the first time increment, information from detector 34 would be stored in channel 0 and the information from detector 48 in channel 50. The memory would then be indexed by 1 and at the end of the next time increment detector 34 information will be stored in channel 51 and so on until all of the data required has been taken and the instrument is stopped manually. The multiscaler mode thus acts as 100 scalers, each scaler recording the counts from a single-channel analyzer sequentially for a set time increment.

The third mode of operation, namely the Mossbauer mode, is similar in operation to the multiscaler mode since the channel addresses are sequentially selected by a timer. A synchronized staircase voltage is provided to an external connector. This voltage is used to vary the velocity drive of the external equipment. As the velocity is varied, a detector signal is fed to the single-channel analyzer 10 and stored in the memory output register 50. The memory address register 18 is sequentially indexed. The contents of the output register 50 are added to the counts previously stored in the memory.

The Mossbauer mode requires that the memory address be synchronized to a linear sweep voltage. The sweep voltage is used to vary the velocity drive of the external equipment. As the velocity is varied, a detector output passes through the input amplifier and a single-channel pulse height analyzer and is counted in the memory output register. As the address register is sequentially indexed, the contents of the output register are added to the counts previously stored in the memory. The address register may be indexed in one of three ways; namely, an internal timer, an external timer, or external ramp sweep voltage. When the internal or external timer is used, a ramp sweep voltage is provided by performing a digital-analog conversion on the contents of the address register. When an external ramp voltage is used, it is first digitized by means of the pulse height analog-digital converter 14 for driving the address register 18.

In the fourth mode of operation, namely, the signal enhancement mode, coherent periodic signals are extracted from the midst of excessive noise. The input signal is sampled and digitized 100 times per period. At each sample, the accumulated data is compared to the new input data and is modified accordingly.

The relative weighting of the new input data and the accumulated data is continuously changed as the number of cycles is increased, with the new data given less and less weight. Since noise is random in nature it will average out to zero eventually if enough cycles are sampled, whereas the coherent signal amplitude remains constant. In this analyzer, the maximum number of cycles to be sampled is 100. Since the statistical inaccuracy is inversely proportional to the square root of the number of cycles to be sampled, a 10 to 1 improvement in signal to noise will be achieved.

Referring now more particularly to FIGS. 4 and 5, the analog-to-digital converter 14 and its operation will now be described in detail. Essentially, the converter is a 10 megacycle, capacitor discharge gated clock type. In the converter each pulse amplitude (or energy) is converted into an equivalent time interval. The number of pulses from a free running 10 megacycle oscillator 52 which occur during this interval, are sorted by the memory address register 18 (FIG. 2) and fed to the appropriate section of the memory. This gives a quantified digital measurement of the amplitude of the input signal. The final position in the address register identifies channel in the memory in which the pulse is stored. The analog-digital converter consists very basically of a charging capacitor 54, a constant current generator 56, a comparator discriminator circuit 58, a conversion gate 60, and AND-gate 62 and the 10 megacycle oscillator 52. A flip-flop circuit such as shown in Standard Handbook for Electrical Engineers, Tenth Edition, section 27, page 25 may be used for conversion gate 60.

The signal from the detector is fed to a linear amplifier 64 and amplified to some pulse height dependent upon the force and fine gain settings (see FIG. 5). The amplifier output charges the capacitor 54 to a voltage equal to the peak amplitude of the signal, point C (if the signal output is 5 volts, the capacitor is charged to 5 volts) once the capacitor is charged, a diode 66 offers a high-back impedance preventing the capacitor from discharging. The same pulse from the amplifier is fed into the pulse height analyzer. When the trailing edge of this pulse passes a lower level discriminator 68 an output pulse is generated, point B. This pulse sets (opens) the conversion gate flip-flop. The shift in DC level from the conversion gate opens the switch (gate) on the constant current generator allowing the capacitor to discharge in a linear function, point $C_1$. At the same time, the signal from the conversion gate is fed to the constant current generator, it is also fed to the AND-gate 62 to open it and allow the pulse from the 10 megacycle oscillator to pass. (The 10 megacycle oscillator is always on). When the capacitor voltage passes a predetermined lower level (this lower level is the same as the one used in the pulse height analyzer) in the comparator circuit, an output pulse is generated, point F. This pulse is fed to the conversion gate resetting it (to turn it off), turning off the constant current generator and closing the AND gate so that no more pulses from the oscillator will be counted. The width of the output pulse from the conversion gate is proportional to the amplitude of the output pulse from the amplifier and is 1 microsecond in width for every 1 volt in amplitude. The number of pulses passing through the AND gate from the 10 megacycle oscillator is then also dependent on the width of the signal from the conversion gate. For every one volt and pulse amplitude, 10 pulses will appear at the output of the AND gate. These pulses are then fed to the memory address register.

The memory 16 typically is of the magnetic core type and functions as the analyzer's permanent data storage section, storing the analyzed data for later use. The memory matrix in the present embodiment consists of 24 core planes and the required address, sense and inhibit lines.

In typical matrix fashion, the selection of an address line of a single row and the address line of a single column selects one core on each plane. Thus, in the memory, any of 100 possible addresses may be selected each having 24-bit data capacity (10⁶ count capacity).

In the multichannel mode of operation, the function of the single-channel analyzer 10 is to set the reference level for channel 0. If the lower level control is set for 0 percent, the window for 100 percent, and the system is calibrated for 1 Mev. full scale, then the full energy spectrum of 0 to 1 Mev. will be analyzed and stored. However, if the lower level control is moved to 10 percent, then the spectrum will be shifted such that 0.1 Mev. will be stored in channel 0 and 1.1 Mev. will be stored in channel 99.

The single-channel analyzer 10 is the controlling analyzer for the analog-digital converter 14. It is used in the coincidence-anticoincidence mode and is gated by the single-channel analyzer 12 so that the analog-digital converter 14 sees only the coincidence or anticoincidence counts coming from the single-channel analyzer 10 in the multiscaler mode, single-channel analyzer 10 and the single-channel analyzer 12 are used as independent analyzers for those studies requiring dual detectors.

In order to compensate for the possibility of a shift in the spectrum due to changes in the amplifier or photomultiplier tube gain or high-voltage output, the system is provided with a built-in spectrum stabilizer in which the overall effective gain of the system is enclosed in a feedback loop. Two or more sets of channels are preselected to straddle the photopeak of the isotope on which the system is stabilized. These stabilizing channels are selected by front panel thumb wheel switches 70 to flag a low channel and an upper channel bit in the memory 16. As each input pulse arrives, a check is made in a flag detector 86 to see if it belongs in one of the preselected flagged channels. If it does, its memory contents are updated by one as are all other channels; however, a separate forward-backward counter 72 is also indexed by 1, either in the plus 1 or minus 1 direction depending upon which side of the peak the pulse lies. If the system gain changes, a net count will be stored in the forward-backward counter 72. The output of the counter is then converted into a voltage which is used as a reference supply for the analog-digital converter 14.

Typically, the system may correct for a plus or minus 6 percent drift. The spectrum stabilizer essentially eliminates the need for frequent calibration checks normally made in systems of this type.

For example, in a spectrum such as shown in FIG. 6, the two channels selected to stabilize should be as close in count rate as possible. Assume that the monitored substance is an isotope such as Cs 137 and the tube stabilizing channels selected are 60 and 72. If a pulse of 6.0 volts in amplitude comes in, it will be stored in memory position 60. Since 60 had been preselected as a lower channel it will also index the forward-backward counter with plus 1. When a pulse of 7.2 volts comes in, it is stored in channel 72 and the forward-backward counter will be indexed by minus 1. If the same number of plus 1's and minus 1's are recorded, the spectrum is in equilibrium and the forward-backward counter's net count is 0 and no corrected voltage is generated. If, however, the counts in channel 60 were greater than those in channel 72, a correction signal would be sent to the analog-digital converter 14 to stabilize the spectrum. Each count provides a correction increment of plus or minus 0.1 channel.

With the memory group switch 76 in the single input position, the input to the single-channel analyzer 10 is stored time sequentially from channels 0 to 99. In the dual input position, two inputs are time multiplexed (switched) at a fast rate during each dwell time. The input to single-channel analyzer 10 is stored from channels 0 to 49 and the input connected to single-channel analyzer 12 is stored from channels 50 to 99, during each dwell time (counting) each input is active 50 percent of the time. Once switched to the display mode, two superimposed traces are generated to allow comparison or they can be separated as individual displays to observe the output from each analyzer. The memory grouping mode in the multiscaling mode is extremely useful for dynamic function studies such as cardiac or circulatory studies or in renal function studies where the information from one kidney can be stored in channels 0 to 49, and the second kidney in channels 50 to 99. The data can by then be photographed on film, printed on paper tape at 46, or paper punch at 40, or the information stored in the memory can be plotted in analog fashion on the single pen recorder 36 or X-Y plotter 38 by sequentially stepping through channels 0 to 99 thus eliminating the need for a dual pen recorder. If stored on paper tape punch, it can be later read back in the memory and displayed for further study.

In the multichannel mode memory grouping is also used to provide a means of comparing spectra of two isotopes simultaneously. Only single-channel analyzer 10 is used and the complete 100 channels of information or sample number 1 would be stored in channels 1 through 49. For the second sample, the complete 100 channels of information would be in channels 50 to 99. The visual display is then superimposed or it may be separated with channels 1 through 49 on the bottom and channels 50 through 102 on the top.

In any conventional counting system, some data will be lost due to the characteristic dead time of the system. This loss will increase with count rate until it becomes necessary to compute correction factors. When many samples are counted, the correction on every result becomes time consuming and subject to error. A direct approach to minimize this loss and the consequent need for correction is to reduce the characteristic dead time of the system.

The most direct and convenient solution to this problem is live timing. This technique employs electronic gating of the system timer 26 so that it is allowed to accumulate time only when the measurement system (analog-digital converter 14) is capable of accepting an input pulse, that is, when it is live. Conversely, when the system is in the process of analyzing and storing a count, it is dead and the timer is stopped. In this way, the total count stored is directly and correctly related to the time indicated by the timer.

This approach may be compared to a football game where live timing is used. The score board clock is in fact a live timer and runs only during actual play. Whenever the play is stopped, (or is dead) the scoreboard clock is stopped as well so that it directly represents actual playing time. In the case of the present system or the football game, it is clear that a normal timepiece will indicate a greater elapsed time than the system timer and will actually indicate the sum of the dead time and the live time. In the present system, as shown at 88, a precision 500 kc. crystal controlled time base is used to measure live time with high accuracy.

A key feature of the analyzer is the ability to expand the selected portion of the spectrum by a factor of X2, X5 or X10 effectively giving 1,000 channel amplitude resolution. In the X10 mode, 10 percent of the spectrum will be expanded, in the X5 mode, 20 percent will be expanded, in the X2 mode 50 percent will be expanded to cover the complete 100 channels. For example, if the spectrum is originally accumulated in the X1 mode with full scale equal to 1 Mev., the full 1 Mev. spectrum will be displayed. Then, by changing the spectrum expand to X10, a 10 percent portion of the spectrum will be intensified on the oscilloscope screen. The position of this 10 percent intensified section of the spectrum can be varied by single-channel analyzer 10 base line control selecting the particular 10 percent region of the spectrum to be expanded. Once this has been determined the memory clear button is pressed and the mode switch turned to count. The start button is pressed, a new spectrum will be accumulated now storing only that 10 percent selected portion in the 100 channels, thereby expanding by 10 the number of points taken on the spectrum. This information may be photographed and printed on a paper tape, punch tape or on the pen recorder or XY plotter. In addition to being able to manually select the region to be expanded, an automatic sweep is also provided. In the automatic mode, with the expander on X10 and the full scale again equal to 1 Mev. and the channel reference set for 0, the analyzer will accumulate the first 10 percent of the spectrum (100 Kev.) in the 100 channels, transfer the memory contents to the readout device (paper tape punch or printer) clear the memory and automatically advance he next 10 percent portion, repeating this until the complete spectrum has been accumulated so that what was originally stored in 100 channels has now been expanded to double 1,000 channels.

The inclusion of a second complete amplifier and single-channel analyzer to the system provides flexibility in the use of the instrument for coincidence or anticoincidence counting, whichever mode is required is selected by a front panel switch. This switch selects single-channel analyzer 12 to gate single-channel analyzer 10, which controls the analog-digital converter 14 in coincidence or anticoincidence. The same switch has an external position for gating single-channel analyzer 10 from an external signal. A beta gamma coincidence system is a good example where a sample such as Au 198 (gold), Co 60 (cobalt), etc., emits a beta for every gamma emitted.

The gamma detector would be connected to single-channel analyzer 10 which controls the analog-digital converter 14 and the beta detector to single-channel analyzer 12 as suggested in FIG. 7. Since single-channel analyzer 12 output gates single-channel analyzer 10 a spectrum of only those gamma pulses that are in coincidence or anticoincidence with the beta would then be stored in the analog-digital converter 14 and displayed on the oscilloscope 20. Those gamma signals not in coincidence or anticoincidence are brought to a rear-panel connector and can then be counted in one of three digital channels. This allows all the gammas to be counted with the coincidence ones stored in channels 1 through 100 and the anticoincidence ones stored in channel 101; by switching to anticoincidence the gammas in anticoincidence will be stored in channels 1 to 100.

After the data has been collected and while in the display mode, the 100 channels may be divided into three arbitrary sections to allow digital summation; (integration of the area under the curve) of the data into the three digital channels 100, 101, and 102. The first and last channels on each system to be summed are selected by front panel thumb wheel switches, the summation is then stored in the memory in location 100, 101 or 102 displayed on the oscilloscope and may be printed out with the other data.

A two-position switch allows the complete 103 channels, or only the three integrations channels to be printed out. The full scale capacity of each of the three integrations channels is $1 \times 10^6$ counts, however, when the integration channels are used, the count capacity of the 100 channels is reduced from $1 \times 10^6$ to $1 \times 10^5$.

If the areas under the curve (FIG. 8) in sections 1, 2 and 3 are to be integrated, the integrate switch is placed in the integrate mode and the two thumb wheel switches set for 15, the lower channel button would be pressed setting up a flag bit in channel 15. Next the thumb wheel switches are set for channel 25 and the upper channel switch pressed. This is repeated for all three areas. The analyzer is stepped time sequentially from channel 0 until it reaches the first flag bit. From this point to the next flag bit, all data in any one of these succeeding channels is summed and stored in channel 100, the next channel 101 and the last in channel 102.

The three integration channels may also be used to count three high-level inputs when in the count mode. Signals such as live time or the output of single-channel analyzer 12 may be counted and stored in channels 100, 101 or 102.

The three digital channels may be used only for one function at a time. If used as high-level inputs during count, they cannot then be used to store the integration data.

In the multichannel count mode, the system stops counting on either preset count or preset time whichever comes first. The range switch is used for determining the full scale count in any one channel, for $10^3$ (1K), $10^4$ (10K), $10^5$ (100K), or $10^6$ (1M) counts. The preset count may be disabled by switching the preset count switch to the out position.

In the preset time mode three options for selecting the time are available, a five-position rotary switch allows the selection of 0.6, 6.0 or 60 milliseconds from the electronic timer, or the electromechanical timer may be switched and preset for any time from 0.001 minute to 999.999 minutes. There is also a position for use with an external timer. The electromechanical timer may also be used to record live time or relapsed time.

In the readout mode, the contents of the memory 16 are transferred to an output-recording device. The system has outputs for driving a serial paper tape printer or paper tape punch. The time required to readout is dependent on the maximum operating speed of the readout device.

In addition to the outputs for use with serial printers and paper tape punches, the system has two analog outputs for use with the strip chart recorder of the X-Y plotter. Available in the rear panel of the system are analog outputs in linear form for use with a 1 milliampere or 100 millivolt strip chart recorder. In those applications where dual inputs are used, and the information stored in channels 1 through 49 and 50 through 99, only a single-strip chart recorder is required to plot both sets of data because the analyzer is sequentially stepped through the 100 channels.

There are provisions made controlling the X axis on the X-Y plotter by means of a staircase voltage generated by the memory address register 18 (channel number).

In addition to the readout mode, a read-in mode is provided. In this mode the data stored in the memory and printed on the paper tape punch or data generated from other external equipment in the proper format may be put back into the memory and redisplayed for further evaluation by means of an auxiliary paper tape reader. This feature allows background information before each run. The background may be inserted in the subtract mode and the data in the add mode, thereby leaving net counts over background stored in the memory.

The read-in mode is extremely useful for the clinical investigator whereas the patient data taken during the day may be stored on tape and replayed for more extensive study at a later time.

For example, a number of renal clearance studies may be performed by the technician and stored on tape. The clinician can then play these back and plot the information on an analog recorder or photograph the display for a permanent record. The integration mode allows the investigator to integrate the area under the curve in any of three sections of the accumulated data.

At the end of a count mode, the instrument switches into a display mode in which the contents of the memory are displayed on the oscilloscope 20. For ease in determining channel number every 10 th channel is intensified on the screen. In the normal display, the contents of the 103 channels are displayed on one trace from left to right. A dual trace is also provided for superimposing channels 50 through 102 over 0 through 49.

In order to aid in selecting the portion of the spectrum to be examined in the expanded mode when the expander is placed in a position other than the X1 range, those memory addresses corresponding to the baseline setting of single-channel analyzer 10 and the expander range are further intensified. The intensified section moves along the trace as the baseline is varied. If the expander is in the 10 percent position, a 10 percent portion is intensified; in the X5, 20 percent is intensified; in the X2, 50 percent is intensified. A permanent record of the display may be obtained by photographing the display. Additional controls for scale illumination, focus intensity, horizontal and vertical position, vertical separation and vertical gain are provided.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patents of the United States is:

1. A multimode spectral analyzer, comprising:
a. a plurality of scintillation detectors,
b. a single-channel analyzer connected to each detector adapted to pass from an associated detector pulses of a selected amplitude,
c. an analog-to-digital converter connected to said analyzer and adapted to convert said pulse into a series of pulses proportional in number to the amplitude of the pulses passed by said analyzer,
d. magnetic memory means including multiple channels for receiving data on multiple pulse amplitudes from a plurality of said detectors, said magnetic memory means operatively connected to said analog-to-digital converter for storing said series of pulses,
e. detecting means operatively connected to said magnetic memory means and analog-to-digital converter, said detecting means operating to stabilize said analyzer and compensate for shifts in the spectrum;
f. programming means electrically communicating with said analog-to-digital converter for selectively controlling the series of pulses applied to said magnetic memory means from said analog-to-digital converter in such a manner that said multimode spectral analyzer is selectively operable as a multichannel pulse height analyzer, a multiscaler, a Mossbauer analyzer, and signal enhancer, and
g. display means operatively connected to said memory means for presenting a visual output of the data stored in said memory means.

2. A spectral analyzer according to claim 1 wherein said display means is a cathode-ray tube.

3. A spectral analyzer according to claim 1 including a spectrum expander for expanding selected portions of the spectrum over all channel.

4. A spectral analyzer according to claim 1 including integrating means associated with each channel for integrating data accumulated therein.

5. A spectral analyzer according to claim 1 including multiscaling means for performing a gross count in each channel for a preset time and then sequentially stepping to each successive channel.

6. A spectral analyzer according to claim 1 including gating means controlling said converter for counting with multiple detectors whereby selectively the coincidence or anticoincidence count between the detectors is fed to said memory.

7. A spectral analyzer according to claim 1 wherein said detecting means includes a flag detector and a forward-backward counter.

8. A spectral analyzer according to claim 1 including:
a. first digital-to-analog converting means operatively connected between said analog-to-digital converter and said display means; and
b. second digital-to-analog converter means operatively connected between said magnetic memory means and said display means.

9. A spectral analyzer according to claim 1 wherein said detecting means includes a flag detector and a forward-backward counter, said flag detector operatively connected between said forward-backward counter and said magnetic memory means, said forward-backward counter connected between said flag detector and first digital-to-analog converter.

* * * * *